United States Patent
Trambusti

(10) Patent No.: US 11,478,961 B2
(45) Date of Patent: Oct. 25, 2022

(54) PROCESS FOR OBTAINING THERMO-STRUCTURAL COMPOSITES

(71) Applicant: FORMTAP INTERNI SISTEMAS AUTOMOTIVOS S/A, Betim (BR)

(72) Inventor: Fausto Raphael Trambusti, São Paulo (BR)

(73) Assignee: FORMTAP INTERNI SISTEMAS AUTOMOTIVOS S/A, Betim (BR)

( * ) Notice: Subject to any disclaimer, the term of this patent is extended or adjusted under 35 U.S.C. 154(b) by 378 days.

(21) Appl. No.: 16/618,484

(22) PCT Filed: Nov. 18, 2019

(86) PCT No.: PCT/BR2019/050496
§ 371 (c)(1),
(2) Date: Dec. 2, 2019

(87) PCT Pub. No.: WO2020/102871
PCT Pub. Date: May 28, 2020

(65) Prior Publication Data
US 2021/0323199 A1   Oct. 21, 2021

(30) Foreign Application Priority Data
Nov. 22, 2018  (BR) .................. 102018074000-8

(51) Int. Cl.
*B29C 43/00* (2006.01)
*C08K 3/34* (2006.01)
*C08K 7/14* (2006.01)
*B29K 75/00* (2006.01)
*B29K 309/08* (2006.01)
*B29K 105/04* (2006.01)

(52) U.S. Cl.
CPC .............. *B29C 43/003* (2013.01); *C08K 3/34* (2013.01); *C08K 7/14* (2013.01); *B29K 2023/06* (2013.01); *B29K 2075/00* (2013.01); *B29K 2105/04* (2013.01); *B29K 2309/08* (2013.01)

(58) Field of Classification Search
CPC . B29C 43/003; B29C 44/025; B29C 44/0446; B29C 44/1219; B29C 44/148; B29C 44/358; B29C 45/0005; B29C 2045/0006; B29C 2045/008; B29C 66/721
See application file for complete search history.

*Primary Examiner* — Stella K Yi
(74) *Attorney, Agent, or Firm* — Browdy and Neimark, PLLC

(57) ABSTRACT

"IMPROVEMENT INTRODUCED IN THE PROCESS OF OBTAINING THERMO-STRUCTURAL COMPOSITES", resulting from the union of various synthetic materials (F), which go through a phase of couplings (union of materials), to be subsequently heated and pressed into molds (M) of specific size for each part to be molded, at temperatures and pressure suitable for the fusion of these elements, featured by the fact that the thereto-structural composite (1) is obtained from the formation of the substrate (S), with the synthetic fiber molding (F), foams, etc., preferably Non-Woven (NW-TNT)+PE Film+Fiberglass+Semi-Rigid PU Foam embedded in a chemical formulation (FO) of Diphenylmethane Diisocyanate (MDI) in a ratio of 30% to 80% and Methylene Chloride (CM) in the ratio of 20% to 70%; and for processing the product, a catalyst prepared from Dabco Cristal in the ratio of 1% to 30% is used; by adding 70% to 99% water, said substrate (S) may, during the hot-molding phase, receive the addition of finishes (5) and, after the molding phase, receive the addition of minor and complementary structural elements (6).

12 Claims, 1 Drawing Sheet

PROCESS FOR OBTAINING THERMO-STRUCTURAL COMPOSITES

INTRODUCTION

The present invention is an improvement in the process of obtaining thermo-structural composites used in the automotive industry, such as sunshades, ABC internal columns, integral parts of door panels (medallions), full door panels, packages holder, dashboards, armrest center consoles (between the front seats) and can be applied to segments other than the automotive segment, such as ceiling and wall appliances such as stoves, refrigerators, ovens and microwaves, which feature weight reduction as well as improved acoustic and thermal performance, as well as high impact resistance.

TECHNIQUE STATUS

The traditional technique of obtaining internal structural parts for automobiles provides for different parts in the interior components of automobiles, which are customarily manufactured by the automotive industry, based on polyurethane (PU), polypropylene (PP) foams, natural fibers (wood or jute) and rigid and/or semi-rigid injected plastic materials.

In addition, other materials are added to each part, depending on their use, such as the sun visor, which has a metal or plastic articulation frame inside; automotive door panels, which are polymeric in structure, with or without the addition of parts made from natural fiber composites, coupled with fabric, vinyl or leather finishes.

These elements (polymers), practiced inside most cars, are made of materials that have great physical strength and design flexibility, but can present "plastic blades" in conditions of deformation and rupture, when subjected to strong impacts usually caused by collisions.

Due to their weight and impact-absorbing characteristics, semi-flexible foams are widely used in the manufacture of car interiors such as: dashboards; sunshade, headrest; ceilings, etc., since these semi-flexible foams are usually protected by a decorative face made of vinyl, foamed fabrics or TNT, and their molds are usually made of steel or aluminum.

Flexible and semi-flexible foams use water as a blowing agent and have mostly open cell structure, and the openness of these cells is critical as the finished parts cannot be crushed (after demolding), to eliminate shrinkage while still maintaining thermal and acoustic characteristics.

The manufacture of semi-flexible foams is more complex and involves other distinct additional steps, the most commonly used process employing systems utilizing MDI derivatives and reactive polyether polyols. This process is used for tissue-attached foams to achieve "touch with memory" on the exterior trim of the parts, providing better interior comfort inside the vehicles.

Semi-rigid foams are used as shock absorbers such as bumpers and automotive roofs. These foams are semi-rigid in nature, resembling rigid ones and may not recover their initial shape with the same performance as flexible foams, depending on the impact force. Like flexible and semi-flexible foams, semi-rigid foams have more than 90% open cells in their structure. The difference is that due to the higher rigidity of their structure, semi-rigid foams, when subjected to compression tests, return more slowly to their original shape.

When the foam is impacted, it can absorb and dissipate energy in two ways: i) by pneumatic damping (expulsion and re-entry of air trapped in cellular structures during deflection) and ii) mechanical damping (deflection of the cellular structure), with the face material also acting as a charge distributing mechanism to increase deceleration during the impact of a body.

In addition to polyurethane (PU), polypropylene (PP) foams and injected and rigid plastics, thermo-molded materials resulting from the molding of several layers of fibers with or without the addition of resins are also used in the automotive industry.

These manufacturing processes result in heavier parts, lower impact resistance, lower acoustic and thermal performance and, of course, a high manufacturing cost.

Technique Status Analysis

There are several solutions for the manufacture of thermo molded structures for automobiles and other sectors, notably PI 0413887-2, PI0502033-6 and WO9320131A1, which foresee a process of manufacturing insulating molded structures, but without reaching the necessary parameters for safety, thermal and acoustic insulation and reduction of production costs.

OBJECTIVES OF THE IMPROVEMENT

The main objective of the present improvement is to obtain a thermo-structural composite with greater impact resistance, including the possibility of creating point reinforcements in specific parts of the part that receive greater impacts; with high acoustic and thermal performance.

Another object of the present improvement is the possibility of said thermo structural composite to receive other smaller structural and complementary elements, components of each set such as hinge elements as in the case of sunshades, fasteners as in the case of columns and door panels, etc., said structural and complementary elements being made of plastics, resins, metals, etc.

It is also the objective of the present improvement to produce a thermo structural composite that enables the receipt of high level exterior finish without changing its resistance, acoustic and thermal characteristics.

BRIEF DESCRIPTION OF THE INVENTION

To address the above drawbacks and to provide improvements in the thermo structural composite fabrication process, the present "IMPROVEMENT INTRODUCED IN THERMO-STRUCTURAL COMPOSITE PROCESSING", which presents a process for obtaining coating elements and other automotive components practiced inside cars, complementing the aforementioned (rigid, semi-rigid and flexible) foams with the addition of geometrically structured glass fibers and new MDI-derived chemical formulations, with the possibility of creating punctual reinforcements in specific regions of the parts, according to the needs inherent to each type of product, customer and market.

This improvement provides for the possibility of including noble finishes in the thermo-structural composite in order to improve the visual appearance of the part (finishing), can be added vinyl, leather, leatherette, foamed fabrics, vinyl coupled fabrics, ovate blanket, TNT, etc., without prejudice to the performance of resistance, thermal, acoustic and density.

They also allow high design flexibility, curves and grooves with aggressive angles, including the possibility of recycling the materials used.

The thermo-structural composite, object of the present, comes from the union of various synthetic materials, which go through a phase of couplings (union of materials), to subsequently be heated and pressed in specific molds at temperatures and pressure suitable for the fusion of said elements.

In addition, each element may or may not receive other minor structural and complementary elements, components of each assembly such as hinging elements such as sunshades, fastening elements such as in columns and door panels, etc., said structural and complementary elements being made of plastics, resins, metals, etc.

Following molding of parts and addition of complementary structural elements, the parts produced receive appropriate finishes and compatible with the car model and other miscellaneous segments such as plastic, fabric, vinyl, leather or leatherette coatings or appropriate paints.

BRIEF DESCRIPTION OF DRAWINGS

In addition to the present description in order to gain a better understanding of the features of the present improvement and according to a preferred practical embodiment thereof, accompanying the attached description is a set of drawings, where, by way of example, although non-limiting, the following was represented.

DETAILED DESCRIPTION OF THE INVENTION

Figure 1:
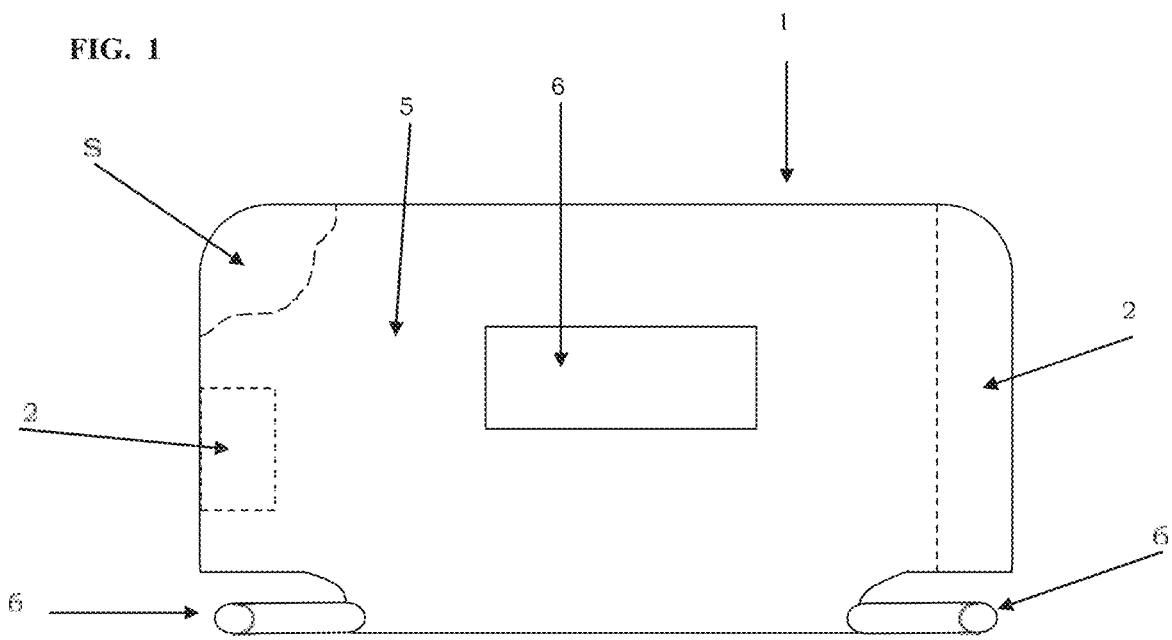
FIG. 1 shows the finished thermo-structural composite, with indications of areas of greatest impact and minor structural components added.
Figure 2:
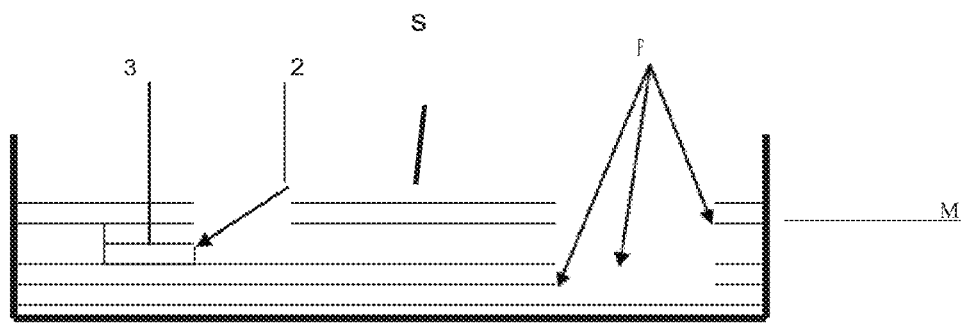
FIG. 2 shows the insertion of additional fibers at specific locations of the thermo-structural composite.
Figure 3:
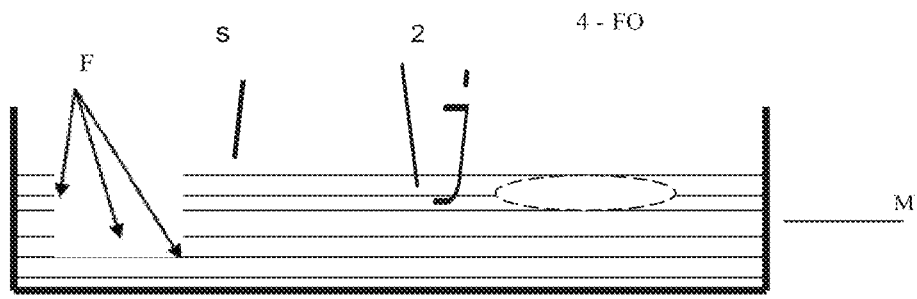
FIG. 3 presents the application of adjustments in the dosages of the chemical formulation, in specific places of the thereto-structural composite.

As the related figures illustrate and are provided for in the invention, the present "IMPROVEMENT INTRODUCED IN THE PROCESS OF OBTAINING THERMO-STRUCTURAL COMPOSITES" comes from the joining of various synthetic materials (F), which undergo a coupling phase (joining of materials), to be subsequently heated and pressed into specific molds (M) at temperatures and pressure suitable for the fusion of said elements, more particularly from a process of obtaining thermo-structural composites (1), with the conformation of the substrate (S) from synthetic fibers (F), foams, etc., preferably Non-Woven (NW-TNT), plus PE Film, plus Fiberglass, plus semi-rigid PU foam embedded in a formulation (FO) of Diphenylmethane Di-Isocyanate Diisocyanate (MDI) in ration between 30% and 80% and Methylene Chloride (CM) between 20% and 70%; for the processing of the product, a catalyst prepared from Dabco Crystal in the ratio of 1% to 30% is also used; adding water in the proportion of 70% to 99%.

The present improvement comprises the possibility of obtaining specific areas (2) in the thermo-structural composite (1), with greater impact resistance, adding, during the assembly process of the fiber layers (F) that substrate (S), one or more layers (3) of fiber (F), in the respective specific area (2), and this point reinforcement (2) can also be obtained by applying (4) adjustments of the dosage parameters of the formulation (FO) presented, which directly influence the rigidity of the substrate (S).

The present improvement is also encompassed by the possibility of applying to the parts to be molded during the substrate molding phase (S) of coatings or finishes (5) which may be woven, vinyl, leather, leatherette, plastics, plastic coatings, suitable paints, etc.

After forming the substrate (S)+finishing (5) (fabric, vinyl, leather, etc.), and for the finalization of the thermo-structural composite (1), they may be added by gluing by Hot melt or over-injection welds, minor structural and complementary elements (6) such as hinged elements as in the case of sunshades, fasteners as in columns, door panels, package holders, dashboards, etc., and such minor structural and complementary elements (6) may be made of plastics, metals, resins, etc.

Although the present improvement is detailed, it is important to understand that it does not limit its application to the details and steps described herein, and said improvement is capable of other modalities and can be practiced or performed in a variety of ways and should be understood that the terminology employed herein is for the purpose of description and not limitation.

The invention claimed is:

1. A process for forming a thermo-structural composite material, comprising:
assembling a combination of synthetic fiber molding and foam comprising Non-Woven TNT, polyethylene film, fiberglass and semi-rigid polyurethane foam into fiber layers for forming a substrate having an outer surface;
embedding or soaking a chemical formulation of diphenylmethane diisocyanate (MDI) and methylene chloride (CM) with a ratio of MDI:CM from 30%:70% to 80%:20% in the fiber layers and adding a catalyst prepared from Dabco Cristal in a ratio to water of 1%:99% to 30%:70% to form a fusion mixture; and
heating and pressing the fusion mixture into molds of specific size for each part of the thermos-structural composite material and hot molding at a temperature and pressure suitable for fusion of the fiber layers in the fusion mixture to form the substrate,
wherein, during hot molding to form the substrate, applying a coating or finish having an outer surface to the substrate being formed, and after hot molding to form the substrate, adding a minor or complementary structural element selected from a group consisting of a hinging element and a fastening element to an area of the substrate to form the thermo-structural composite material.

2. The process of claim 1, wherein, in the assembly step, further comprising adding one or more additional fiber layers to a to-be formed thermographic area of the substrate to achieve reinforcement of the area of the substrate with increased impact resistance.

3. The process of claim 2, wherein, in the embedding or soaking step, further comprising adjusting the amounts of the chemical formulation in a to-be-formed area of the substrate to achieve reinforcement of the area of the substrate with increased impact resistance.

4. The process of claim 1, wherein, in the embedding or soaking step, further comprising adjusting the amounts of the chemical formulation in a to-be-formed area of the substrate to achieve reinforcement of the area of the substrate with increased impact resistance.

5. The process of claim 1, wherein, during hot molding to form the substrate, the coating or finish having an outer surface is selected from the group consisting of fabrics, vinyl, leather, leatherette, plastics, plastic coatings, and paint and is applied to the substrate being formed so as to merge the outer surface of the coating or finish with the outer surface of the substrate being formed.

6. The process of claim 1, wherein a coating or finish is applied to the substrate being formed by hot molding and wherein, after hot molding to form the substrate, the minor or complementary structural element is selected from a hinging element and a fastening element are to an area of the substrate by hot melt bonding or over-injection welding to form the thermo-structural composite material.

7. The process of claim 6, wherein the hinging element is a sunshade.

8. The process of claim 6, wherein the fastening element is selected from the group consisting of door panels, columns, package holders, and dashboards.

9. The process of claim 6, wherein the minor or complementary structural element is made of plastic, metal or resin.

10. The process of claim 1, wherein the hinging element is a sunshade.

11. The process of claim 1, wherein the fastening element is selected from the group consisting of door panels, columns, package holders, and dashboards.

12. The process of claim 1, wherein the minor or complementary structural element is made of plastic, metal or resin.

* * * * *